US008351928B2

(12) United States Patent
Sastry et al.

(10) Patent No.: US 8,351,928 B2
(45) Date of Patent: Jan. 8, 2013

(54) SYNCHRONIZING DHCP AND MOBILE IP MESSAGING

(75) Inventors: Venkateshwara Sastry, Bangalore (IN); Anand Oswal, Sunnyvale, CA (US); Jayaraman R. Iyer, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 845 days.

(21) Appl. No.: 12/102,098

(22) Filed: Apr. 14, 2008

(65) Prior Publication Data

US 2009/0257425 A1    Oct. 15, 2009

(51) Int. Cl.
*H04W 60/00* (2009.01)
*H04W 8/06* (2009.01)

(52) U.S. Cl. .................. 455/432.1; 455/435.1
(58) Field of Classification Search ............... 455/435.1, 455/432.1, 433
See application file for complete search history.

(56) References Cited

U.S. PATENT DOCUMENTS

| | | | |
|---|---|---|---|
| 6,643,694 B1 | 11/2003 | Chernin | 709/223 |
| 6,952,428 B1 | 10/2005 | Necka et al. | 370/466 |
| 7,016,353 B2 | 3/2006 | Proctor et al. | 370/392 |
| 7,249,187 B2 | 7/2007 | Sobel et al. | 709/229 |
| 2004/0004968 A1* | 1/2004 | Nassar | 370/401 |
| 2004/0218558 A1* | 11/2004 | Johansson | 370/401 |
| 2006/0200543 A1* | 9/2006 | Kong et al. | 709/223 |
| 2007/0025305 A1* | 2/2007 | Denny et al. | 370/338 |
| 2007/0091842 A1* | 4/2007 | Siddiqi et al. | 370/331 |
| 2007/0189255 A1* | 8/2007 | Navali et al. | 370/338 |
| 2008/0037479 A1* | 2/2008 | Janneteau et al. | 370/338 |
| 2008/0071890 A1* | 3/2008 | Meier et al. | 709/220 |
| 2008/0316979 A1* | 12/2008 | Laroia et al. | 370/338 |
| 2009/0061869 A1* | 3/2009 | Bui et al. | 455/435.1 |
| 2010/0062760 A1* | 3/2010 | Fuccellaro et al. | 455/426.1 |
| 2010/0121985 A1* | 5/2010 | Gotare et al. | 709/249 |

* cited by examiner

*Primary Examiner* — Meless N Zewdu
*Assistant Examiner* — Tangela T. Chambers
(74) *Attorney, Agent, or Firm* — Baker Botts L.L.P.

(57) ABSTRACT

Synchronizing mobility messaging includes receiving an Internet Protocol (IP) address at a Dynamic Host Configuration Protocol (DHCP) server. The IP address is sent by a home agent of a mobile client, where the home agent has a mobility binding for the mobile client. A DHCP request requesting an IP address for the mobile client is received from the mobile client. The DHCP server assigns the IP address to the mobile client. A DHCP acknowledgement comprising the assigned IP address is sent to the mobile client.

19 Claims, 3 Drawing Sheets

SYNCHRONIZING DHCP AND MOBILE IP MESSAGING

TECHNICAL FIELD

This invention relates generally to the field of communications.

BACKGROUND

An endpoint, such as an mobile client, may use a system of communication networks to communicate during communication sessions. In certain situations, the mobile client may not support protocols used by the communication networks. Certain known techniques may be used to accommodate the mobile node. These known techniques, however, are not efficient in certain situations.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF EXAMPLE EMBODIMENTS

Overview

According to one embodiment of the present invention, synchronizing mobility messaging includes receiving an Internet Protocol (IP) address at a Dynamic Host Configuration Protocol (DHCP) server. The IP address is sent by a home agent of a mobile client, where the home agent has a mobility binding for the mobile client. A DHCP request requesting an IP address for the mobile client is received from the mobile client. The DHCP server assigns the IP address to the mobile client. A DHCP acknowledgement comprising the assigned IP address is sent to the mobile client.

Description

Figure 1:
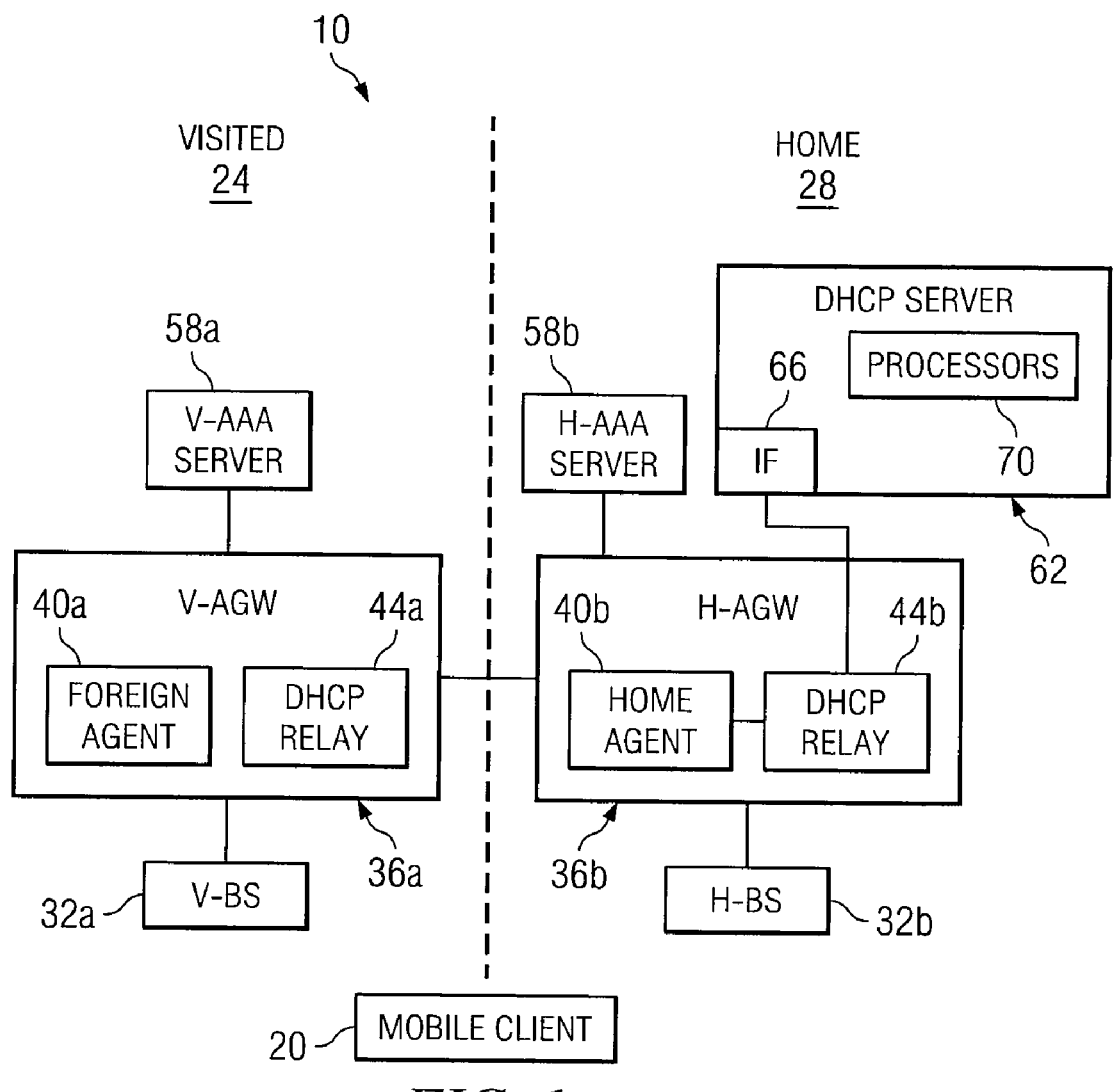
FIG. 1 illustrates one embodiment of a system that communicates packets for an mobile client.

FIG. 1 illustrates one embodiment of a system 10 that communicates packets for a mobile client 20. According to the embodiment, mobile client 20 supports Dynamic Host Configuration Protocol (DHCP), but not mobile Internet Protocol (IP). A DHCP server 62 communicates with a home agent 40b of mobile client 20 to facilitate mobile IP procedures for mobile client 20.

According to the illustrated embodiment, system 10 provides services such as communication sessions to endpoints such as mobile client 20. A communication session refers to an active communication between endpoints. Information may be communicated during a communication session. Information may include voice, data, text, audio, video, multimedia, control, signaling, and/or other information. Information may be communicated in packets, each comprising a bundle of data organized in a specific way for transmission.

According to the illustrated embodiment, mobile client 20 represents any suitable device operable to communicate with a communication network. For example, a subscriber may use mobile client 20 to communicate with a communication network. Mobile client 20 may comprise, for example, a personal digital assistant, a computer such as a laptop, a cellular telephone, a mobile handset, and/or any other device operable to communicate with system 10. Mobile client 20 has a client identifier that uniquely identifies client 20. Examples of client identifiers include a Media Access Control (MAC) address, a Network Address identifier (NAI), and/or other identifier. According to the embodiment, mobile client 20 supports DHCP, but not mobile IP.

System 10 includes communication networks such as visited network 24 and home network 28. In general, a communication network may comprise at least a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication links, or any combination of any of the preceding.

In the illustrated embodiment, visited network 24 represents a communication network that facilitates a communication session for mobile client 20 within the serving area of visited network 24. Home network 28 represents a communication network that maintains a subscription for the subscriber associated with mobile client 20. The subscription may have subscription identifier that uniquely identifies the subscriber, such as an NAI carried in the Mobile IP messaging or an identifier that is set upon authentication. The subscription may include an account that is charged based upon usage by mobile client 20. Visited network 24 and home network 28 may be part of the same or different communication networks.

Visited network 24 includes a visited base station (V-BS) 32a, a visited access gateway (V-AGW) 36a, and a visited authentication, authorization, and/or accounting (AAA) server (V-AAA) 58a coupled as shown. Visited access gateway 36a includes a foreign agent (FA) 40a and a DHCP relay (DR) 44a. Home network 28 includes a home base station (H-BS) 32b, a home access gateway (H-AGW) 36b, a home AAA server (H-AAA) 58b, and a DHCP server (DS) 62 coupled as shown. Home access gateway 36b includes a home agent (HA) 40b and a DHCP relay 44b. In another embodiment, DHCP server 62 and home agent 40b may be located at the same network element.

Base stations 32 provide access services to mobile client 20. For example, a base station 32 may provide Layer 2 mobile access, mobility, and/or handoff services to mobile client 20 within the area of coverage of base station 32.

Access gateways 36 operate as gateways between base stations 32 and IP networks. An access gateway 36 may perform operations such as authenticating mobile client 20, performing handoff functions between access gateway 36 and base station 32, and/or facilitating registration of mobile client 20 to the IP network.

Visited access gateway 36a includes foreign agent 40a and DHCP relay 44. Foreign agent 40a provides home agent 40b of mobile node 20 with a forwarding address to which packets for mobile node 20 may be forwarded. DHCP relay 44 forwards DHCP messages from mobile client 20 to DHCP server 62 and from DHCP server 62 to mobile client 20. Home access gateway 36b includes home agent 40b. Home agent 40b of mobile client 20 maintains the forwarding address of mobile node 20 and forwards packets to mobile node 20.

AAA servers 58 perform authentication, authorization, and/or accounting operations. Home AAA server 58*b* performs these operations for mobile client 20. Visited AAA server 58*a* requests that home AAA server 58*b* performs these operations for mobile client 20 served by visited network 24.

DHCP server 62 assigns IP addresses to mobile clients 20. DHCP server 62 ensures that the assigned IP addresses are unique, that is, that no two or more mobile clients 20 are assigned the same valid IP address. A valid IP address is an IP address with a lease that has not expired. DHCP server 62 also provides configuration parameters, such as addresses of a default gateway, a subnet mask, or a Domain Name System (DNS) server.

DHCP server 62 communicates with home agent 40*b* to synchronize mobile IP and DHCP messages in order to facilitate mobile IP procedures for mobile client 20. As an example, home agent 40*b* or home AAA server 58*b* assigns an IP address to mobile client 20 and sends the assigned IP address to DHCP server 62. DHCP server 62 then sends the IP address to mobile client 20 via a DHCP message. As another example, home AAA server 58*b* sends configuration parameters to home agent 40*b*, which sends the configuration parameters to DHCP server 62. As another example, when DHCP lease time for an IP address expires, DHCP server 62 instructs home agent 40*b* to delete the mobility binding. As another example, when the mobility binding is released at home agent 40*b*, home agent 40*b* notifies DHCP server 62.

System 10 may utilize communication protocols and technologies to provide communication sessions. Examples of communication protocols and technologies include those set by the Institute of Electrical and Electronics Engineers, Inc. (IEEE) standards, the International Telecommunications Union (ITU-T) standards, the European Telecommunications Standards Institute (ETSI) standards, the Internet Engineering Task Force (IETF) standards (for example, IP such as mobile IP), or other standards.

A component of system 10 may include any suitable arrangement of elements, for example, an interface, logic, memory, other suitable element, or combination of any of the preceding. For example, DHCP server 62 may include an interface (IF) 66 that communicates messages with home agent 40*b* via DHCP relay 44*b*, and one or more processors 70 that perform the operations of DHCP server 62.

In general, an interface receives input, sends output, processes the input and/or output, and/or performs other suitable operation. An interface may comprise hardware and/or software. Logic performs the operations of the component, for example, executes instructions to generate output from input. Logic may include hardware, software, and/or other logic. Certain logic, such as a processor, may manage the operation of a component. Examples of a processor include one or more computers, one or more microprocessors, one or more applications, and/or other logic.

A memory stores information. A memory may comprise computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), other computer-readable medium, or a combination of any of the preceding.

Modifications, additions, or omissions may be made to system 10 without departing from the scope of the invention. For example, home agent 40*b* and/or DHCP server 62 may include interfaces, logic, and memory operable to perform the function of home agent 40*b* and/or DHCP server 62. The components of system 10 may be integrated or separated according to particular needs. Moreover, the operations of system 10 may be performed by more, fewer, or other modules. Additionally, operations of system 10 may be performed using any suitable logic. As used in this document, "each" refers to each member of a set or each member of a subset of a set.

Figure 2:
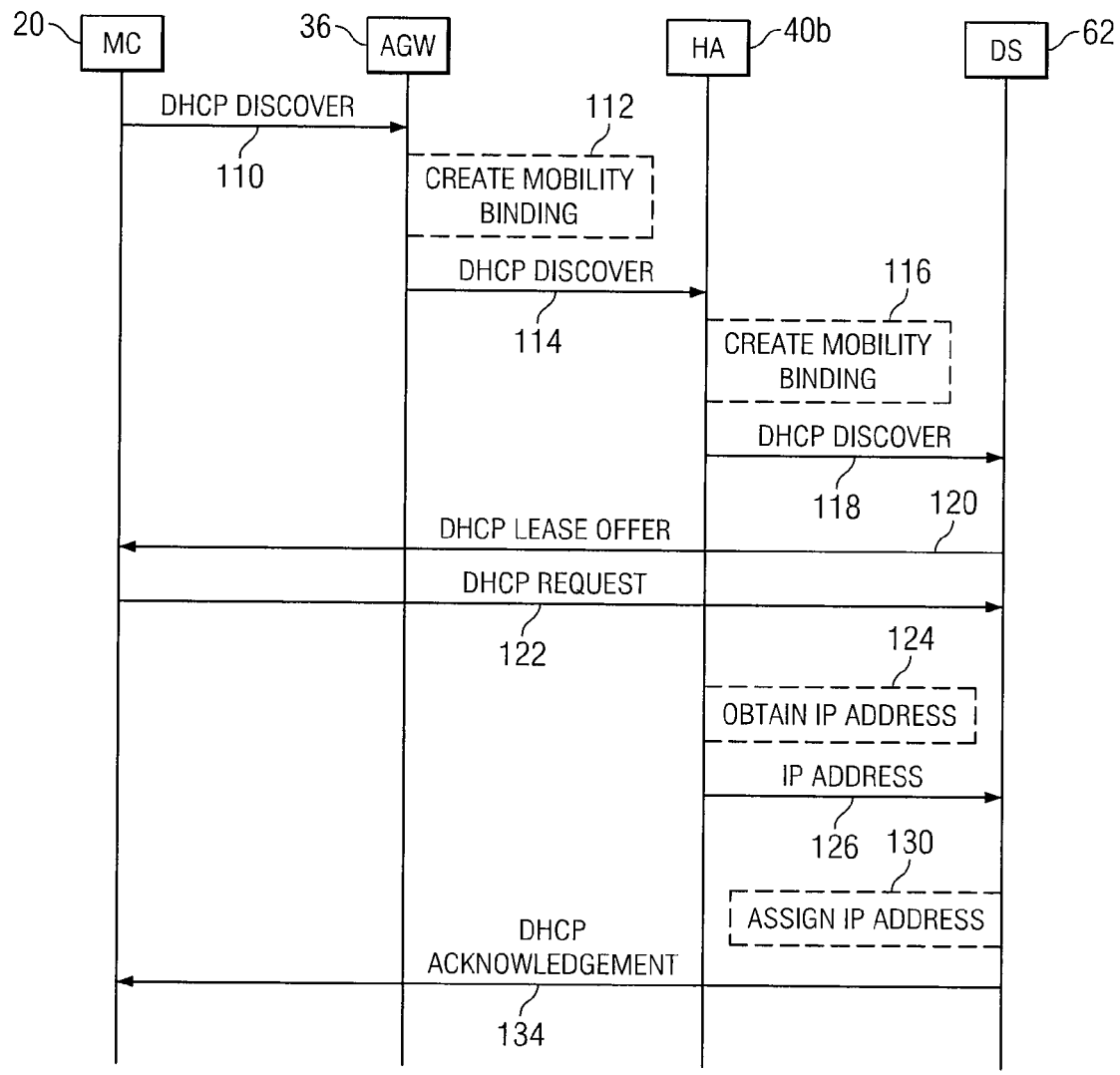
FIG. 2 illustrates one embodiment of a method for synchronizing messaging for providing an IP address for a mobile client that may be used by the system of FIG. 1.

FIG. 2 illustrates an example of a method for synchronizing messaging for providing an IP address for mobile client 20 that may be used by system 10 of FIG. 1.

Mobile client 20 sends a DHCP discover message to an access gateway 36 at step 110. Mobile client 20 sends the discover message to visited access gateway 36*a* if mobile client 20 is in visited network 24 or to home access gateway 36*b* if mobile client 20 is in home network 28. If mobile client 20 sends the discover message to visited access gateway 36*a*, foreign agent 40*a* creates a mobility binding for mobile client 20 at step 112. Visited access gateway 36*a* then forwards the discover message home access gateway 36*b* at step 114.

Home agent 40*b* creates a mobility binding for mobile client 20 at step 116 in response to receiving the discover message, and forwards the discover message to DHCP server 62 at step 118. DHCP server 62 sends a DHCP lease offer to mobile client 20 at step 120. Mobile client 20 sends a DHCP request to DHCP server 62 at step 122. The DHCP request requests an IP address for mobile client 20. The DHCP request may also request configuration parameters, such as a Domain Name System (DNS) server, a lease time for the IP address, or a gateway IP address. DHCP relay 44 may tag the DHCP request with the subscription identifier associated with mobile client 20.

Home agent 40*b* obtains an IP address at step 124. Home agent 40*b* may obtains the IP address from home AAA server 58*a*. Home agent 40*b* may also obtain configuration parameters. Home agent 40*b* sends the IP address to DHCP server 62 at step 126.

DHCP server 62 assigns an IP address at step 130. DHCP server 62 may use the IP address suggested by home agent 40*b* or may select a different IP address associated with mobile client 20. DHCP server 62 may store and use the subscription identifier in the DHCP request to assign the address. DHCP server 62 sends the assigned IP address to mobile agent 20 in a DHCP acknowledgement at step 134. The DHCP acknowledgement may also include the configuration parameters.

Modifications, additions, or omissions may be made to the method without departing from the scope of the invention. The method may include more, fewer, or other steps. Additionally, steps may be performed in any suitable order.

Figure 3:
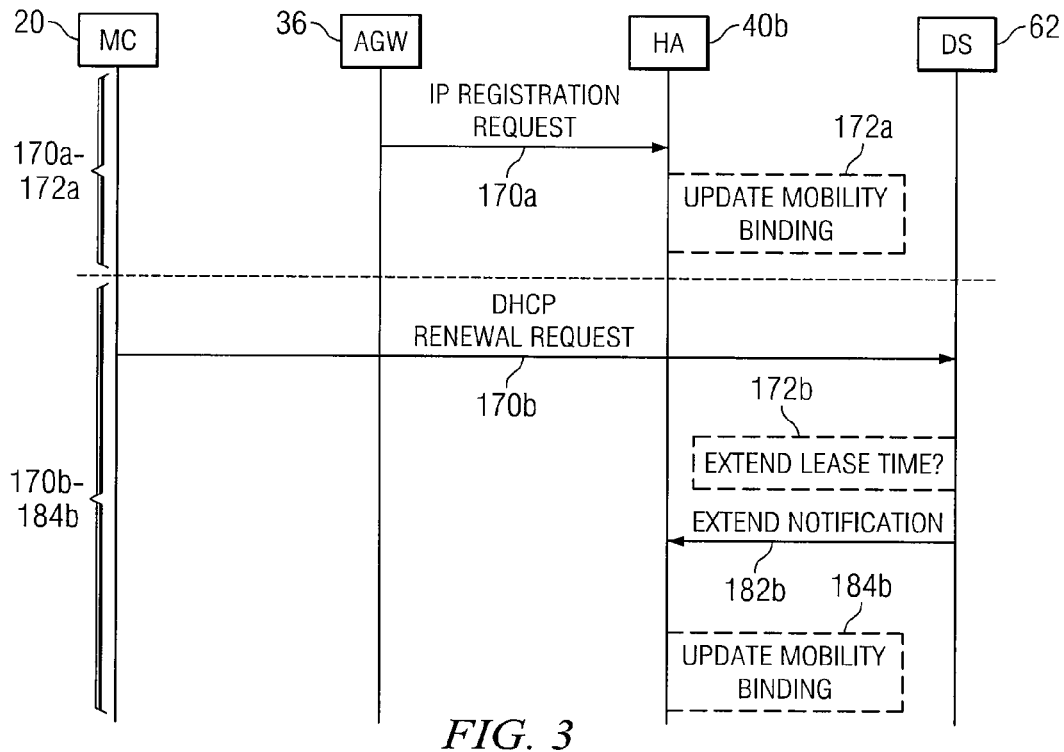
FIG. 3 illustrates embodiments of methods for synchronizing messaging for extending a communication session for a mobile client that may be used by the system of FIG. 1.

FIG. 3 illustrates examples of methods for synchronizing messaging for extending a communication session for mobile client 20 that may be used by system 10 of FIG. 1.

Steps 170*a* and 172*a* describe an example of extending a communication session in response to an IP re-registration request. Home agent 40*b* receives an IP re-registration request through a home or foreign access gateway 36 at step 170*a*. Home agent 40*b* updates the mobility binding for mobile client 20 at step 172*a* in response to the request. There is no need to notify DHCP server 62 of the updating.

Steps 170*b* through 184*b* describe an example of extending a communication session in response to a DHCP renewal request. Mobile client 20 sends a DHCP renewal request to DHCP server 62 at step 170*b*. DHCP server 62 determines if the lease time is to be extended at step 172*b*. If the lease time is to be extended at step 172*b*, DHCP server 62 extends the lease time and notifies home agent 40*b* at step 182*b* that the lease time is to be extended. Home agent 40*b* updates the mobility binding for mobile client 20 at step 184*b* in response to the notification. If the lease time is not to be extended at step 172b, DHCP server 62 does not send the notification to home agent 40b.

Modifications, additions, or omissions may be made to the method without departing from the scope of the invention. The method may include more, fewer, or other steps. Additionally, steps may be performed in any suitable order.

Figure 4:
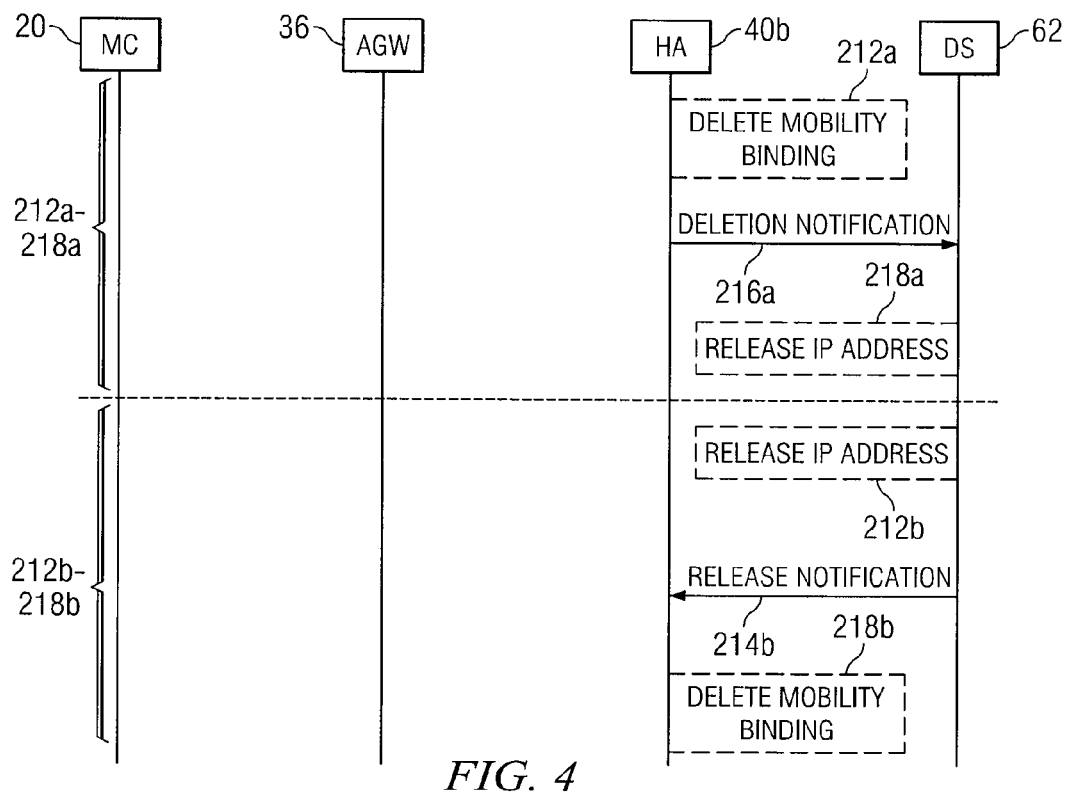
FIG. 4 illustrates embodiments of methods for synchronizing messaging for terminating a communication session for a mobile client that may be used by the system of FIG. 1.

FIG. 4 illustrates examples of methods for synchronizing messaging for terminating a communication session for mobile client 20 that may be used by system 10 of FIG. 1.

Steps 212a through 218a describe one example of terminating a communication session in response to a mobile IP deregistration request. Home agent 40b deletes the mobility binding for mobile client 20 at step 212a. The deletion may be triggered by a deregistration request or expiration of the mobility binding. Home agent 40b notifies DHCP server 62 at step 216a that the mobility binding has been deleted. DHCP server 62 releases the IP address at step 218a.

Steps 212b and 218b describe one example of terminating a communication session in response to a DHCP release request. DHCP server 62 releases the IP address for mobile client 20 at step 212b. The release may be triggered by a DHCP release request sent by mobile client 20 or expiration of the lease time of the IP address. DHCP server 62 notifies home agent 40b at step 214b that the address has been released. The notification may include the subscription identifier store by DHCP server 62. Home agent 40b deletes the mobility binding for mobile node at step 218b.

Modifications, additions, or omissions may be made to the method without departing from the scope of the invention. The method may include more, fewer, or other steps. Additionally, steps may be performed in any suitable order.

Certain embodiments of the invention may provide one or more technical advantages. A technical advantage of one embodiment may be that a DHCP server communicates with a home agent of a mobile client to facilitate mobile IP procedures for the mobile client. Accordingly, the mobile client need not support mobile IP.

Another technical advantage of one embodiment may be that the DHCP server and the home agent may synchronize messages to facilitate mobile IP procedures for the mobile client. As an example, the home agent or home authentication, authorization, and/or accounting (AAA) server assigns an IP address to the mobile client. The assigned IP address is sent to the DHCP server, which sends the IP address to the mobile client via a DHCP message. As another example, the home AAA server sends configuration parameters to the home agent, which sends the configuration parameters to the DHCP server. As another example, when the DHCP lease time for an IP address expires, the DHCP server instructs the home agent to delete the mobility binding. As another example, when the mobility binding is released at the home agent, the home agent notifies the DHCP server.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
  receiving a Dynamic Host Configuration Protocol (DHCP) discover message from a mobile client at a DHCP server, the DHCP discover message forwarded to the DHCP server by a home agent of the mobile client;
  receiving an Internet Protocol (IP) address at the DHCP server, the IP address sent by the home agent of the mobile client, the home agent having a mobility binding for the mobile client, the home agent located in a home network of the mobile client;
  receiving at the DHCP server a DHCP request sent by the mobile client through a DHCP relay of an access gateway, the access gateway distinct from the DHCP server, the DHCP request requesting an IP address for the mobile client;
  assigning, by the DHCP server, the IP address to the mobile client;
  sending a DHCP acknowledgement comprising the assigned IP address to the mobile client;
  releasing the IP address at the DHCP server; and
  notifying, by the DHCP server, the home agent of the mobile client that the IP address has been released.

2. The method of claim 1, wherein:
  receiving the IP address at the DHCP server further comprises:
    receiving one or more configuration parameters from the home agent; and
  sending the DHCP acknowledgement comprising the assigned IP address further comprises:
    sending the DHCP acknowledgement comprising the one or more configuration parameters.

3. The method of claim 1, wherein:
  receiving the DHCP request from the mobile client further comprises:
    receiving the DHCP request comprising a subscription identifier that uniquely identifies the mobile client, the subscription identifier placed into the DHCP request by a DHCP relay.

4. The method of claim 1, wherein:
  receiving the DHCP request from the mobile client further comprises:
    receiving the DHCP request comprising a subscription identifier; and
  assigning, by the DHCP server, the IP address to the mobile client further comprises:
    assigning the IP address according to the subscription identifier.

5. The method of claim 1, further comprising:
  receiving a DHCP discover message at the home agent; and
  creating the mobility binding in response to receiving the DHCP discover message.

6. The method of claim 1, further comprising:
  receiving a DHCP renewal request for the IP address at the DHCP server; and
  notifying the home agent if a lease time for the IP address is to be extended.

7. The method of claim 1, further comprising:
  receiving a release request at the DHCP server;
  releasing the IP address; and
  notifying the home agent that the IP address has been released.

8. The method of claim 1, further comprising:
  generating a notification that the IP address has been released, the notification comprising a subscription identifier associated with the mobile client; and
  sending the notification to the home agent.

9. The method of claim 1, further comprising:
  receiving at the DHCP server a notification that the mobility binding has been deleted; and
  releasing the IP address in response to the notification.

10. An apparatus comprising a Dynamic Host Configuration Protocol (DHCP) server, the DHCP server comprising:

an interface operable to:
  receive a Dynamic Host Configuration Protocol (DHCP) discover message from a mobile client, the DHCP discover message forwarded to the DHCP server by a home agent of the mobile client;
receive an Internet Protocol (IP) address sent by the home agent of a mobile client, the home agent having a mobility binding for the mobile client, the home agent located in a home network of the mobile client;
  receive a DHCP request sent by the mobile client through a DHCP relay of an access gateway, the access gateway distinct from the DHCP server, the DHCP request requesting an IP address for the mobile client; and
logic encoded in one or more tangible media for execution and when executed operable to:
  assign the IP address to the mobile client;
the interface further operable to:
  send a DHCP acknowledgement comprising the assigned IP address to the mobile client; and
  notify the home agent when the IP address is released by the DHCP server.

11. The apparatus of claim 10, the logic further operable to:
receive the IP address at the DHCP server by:
  receiving one or more configuration parameters from the home agent; and
send the DHCP acknowledgement comprising the assigned IP address by:
  sending the DHCP acknowledgement comprising the one or more configuration parameters.

12. The apparatus of claim 10, the logic further operable to:
receive the DHCP request from the mobile client by:
  receiving the DHCP request comprising a subscription identifier placed into the DHCP request by a DHCP relay.

13. The apparatus of claim 10, the logic further operable to:
receive the DHCP request from the mobile client by:
  receiving the DHCP request comprising a subscription identifier; and
assign the IP address to the mobile client by:
  assigning the IP address according to the subscription identifier.

14. The apparatus of claim 10, the logic further operable to:
receive a DHCP discover message at the home agent; and
create the mobility binding in response to receiving the DHCP discover message.

15. The apparatus of claim 10, the logic further operable to:
receive a DHCP renewal request for the IP address at the DHCP server; and
notify the home agent if a lease time for the IP address is to be extended.

16. The apparatus of claim 10, the logic further operable to:
receive a release request at the DHCP server;
release the IP address; and
notify the home agent that the IP address has been released.

17. The apparatus of claim 10, the logic further operable to:
generate a notification that the IP address has been released, the notification comprising a subscription identifier associated with the mobile client; and
send the notification to the home agent.

18. The apparatus of claim 10, the logic further operable to:
receive at the DHCP server a notification that the mobility binding has been deleted; and
release the IP address in response to the notification.

19. One or more non-transitory computer-readable storage media embodying logic that when executed by a processor of a Dynamic Host Configuration Protocol (DHCP) server is configured to:
  receive a DHCP discover message from a mobile client, the DHCP discover message forwarded by a home agent of the mobile client;
  receive an Internet Protocol (IP) address, the IP address sent by the home agent of the mobile client, the home agent having a mobility binding for the mobile client, the home agent located in a home network of the mobile client;
  receive a DHCP request sent by the mobile client through a DHCP relay of an access gateway, the access gateway distinct from the DHCP server, the DHCP request requesting an IP address for the mobile client;
  assign the IP address to the mobile client; and
  send a DHCP acknowledgement comprising the assigned IP address to the mobile client.

* * * * *